United States Patent
Silvestro et al.

(10) Patent No.: US 11,000,793 B2
(45) Date of Patent: May 11, 2021

(54) DUST COLLECTOR

(71) Applicant: Lincoln Global, Inc., Santa Fe Springs, CA (US)

(72) Inventors: Nino V. Silvestro, Independence, OH (US); Brian L. Shetler, Uniontown, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 16/775,647

(22) Filed: Jan. 29, 2020

(65) Prior Publication Data

US 2020/0164300 A1 May 28, 2020

Related U.S. Application Data (62) Division of application No. 15/902,006, filed on Feb. 22, 2018, now Pat. No. 10,821,391.

(51) Int. Cl.
*B01D 46/00* (2006.01)
*B01D 46/42* (2006.01)
(Continued)

(52) U.S. Cl.
CPC ....... *B01D 46/4227* (2013.01); *B01D 46/002* (2013.01); *B01D 46/0005* (2013.01);
(Continued)

(58) Field of Classification Search
CPC ............ B01D 46/4227; B01D 46/0005; B01D 46/002; B01D 46/0068; B01D 46/008;
(Continued)

(56) References Cited

U.S. PATENT DOCUMENTS 4,138,234 A * 2/1979 Kubesa ............... B01D 46/02
                                                     55/374
4,322,231 A    3/1982 Hilzendeger et al.
(Continued)

FOREIGN PATENT DOCUMENTS

EP    3 108 952 A1    12/2016
WO    95/19829 A1    7/1995
WO    2013/058866 A1    4/2013

OTHER PUBLICATIONS

Camfil; Farr Gold Series Brochure; Accessed on Oct. 20, 2017; pp. 1-16.

*Primary Examiner* — T. Bennett Mckenzie
(74) *Attorney, Agent, or Firm* — Brad C. Spencer (57) ABSTRACT

A dust collector includes an enclosure and a tube sheet separating filter and clean air compartments. The tube sheet forms a filter opening and a filter is located within the filter compartment and includes a filter flange having an air outlet aligned with said filter opening. The flange includes first and second alignment structures located on a first lateral side of the flange. A clamping assembly includes first and second filter clamps that are movable between a sealing position for sealing the filter flange against the tube sheet, and a release position. The first filter clamp engages the first alignment structure when in the sealing position. The second filter clamp engages the second alignment structure when in the sealing position. The dust collector includes means for moving the filter clamps between the sealing position and the release position.

20 Claims, 10 Drawing Sheets

(51) Int. Cl.
*B01D 46/24* (2006.01)
*B01D 46/48* (2006.01)
*B01D 46/52* (2006.01)

(52) U.S. Cl.
CPC ....... *B01D 46/008* (2013.01); *B01D 46/0068* (2013.01); *B01D 46/2411* (2013.01); *B01D 46/2414* (2013.01); *B01D 46/48* (2013.01); *B01D 46/521* (2013.01); *B01D 2265/025* (2013.01); *B01D 2267/00* (2013.01); *B01D 2271/02* (2013.01); *B01D 2271/022* (2013.01)

(58) Field of Classification Search
CPC ............ B01D 46/2411; B01D 46/2414; B01D 46/48; B01D 46/521; B01D 2265/025; B01D 2267/00; B01D 2271/02; B01D 2271/022
USPC ... 55/282–305, 356–357, 361–382, 490–519
See application file for complete search history.

(56) References Cited

U.S. PATENT DOCUMENTS

| | | | | |
|---|---|---|---|---|
| 4,335,197 A * | 6/1982 | Chambers | ............... | G03C 7/327 430/271.1 |
| 4,557,738 A * | 12/1985 | Menasian | ................. | A47L 9/20 55/288 |
| 4,632,681 A * | 12/1986 | Brunner | ............. | B01D 46/0005 55/341.1 |
| 4,767,427 A * | 8/1988 | Barabas | ............. | B01D 46/0005 55/493 |
| 4,775,398 A * | 10/1988 | Howeth | ............. | B01D 46/0005 55/302 |
| 4,871,380 A * | 10/1989 | Meyers | ............. | B01D 46/0005 55/483 |
| 5,261,934 A * | 11/1993 | Shutic | .................. | B01D 46/002 95/280 |
| 5,746,796 A * | 5/1998 | Ambs | ................ | B01D 46/0005 55/480 |
| 5,961,696 A | 10/1999 | Gombos | | |
| 6,558,457 B1 * | 5/2003 | Kolczyk | ............. | B01D 53/261 55/318 |
| 6,613,115 B2 * | 9/2003 | Moore | ............... | B01D 46/0005 55/283 |
| 7,776,117 B2 * | 8/2010 | Regnier | ............. | B01D 46/2411 55/378 |
| 9,174,155 B2 | 11/2015 | Morgan et al. | | |
| 2011/0185689 A1 * | 8/2011 | Raether | ............. | B01D 46/0005 55/303 |
| 2012/0324844 A1 * | 12/2012 | Zhang | ................ | B01D 46/0005 55/378 |
| 2016/0303501 A1 * | 10/2016 | Musone | ............. | B01D 46/521 |
| 2020/0047100 A1 * | 2/2020 | Wann | .................... | B01D 46/002 |

* cited by examiner

DUST COLLECTOR

CROSS-REFERENCE TO RELATED APPLICATIONS

The present application is a division of U.S. patent application Ser. No. 15/902,006 filed Feb. 22, 2018, the disclosure of which is incorporated herein by reference.

BACKGROUND OF THE INVENTION

Field of the Invention

Embodiments of the present invention relate to dust collectors and air filters for use in dust collectors.

Description of Related Art

Dust collectors can be installed in fume extraction systems. Certain industrial processes, such as welding, hardfacing, or plasma cutting can generate fumes and dust. Fume extraction systems can remove the fumes and dust from a space (e.g., a work area). Prior to discharging the removed air to another space or outdoors, the air can be passed through a dust collector. The dust collector is an enclosure containing air filters for cleaning the air of certain solid contaminants entrained in the air. A tube sheet within the dust collector partitions the enclosure into a clean air compartment and a filter compartment containing contaminated air. The filters are sealed against the tube sheet. Contaminated air enters the filter compartment, passes through the filters, then through an opening in the tube sheet and into the clean air compartment. The cleaned air can be ducted to an appropriate discharge location.

After a period of use, the filters are replaced. Misaligning a filter within the dust collector can negatively impact the performance of the dust collector, and could result in an improper seal of the filter against the tube sheet. Moreover, changing filters can be time-consuming. It would be desirable to provide a dust collector with an air filter clamping system that accurately positions the filters with respect to the tube sheet and promotes quick replacement of the filters.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a dust collector including an enclosure and a tube sheet separating a filter compartment from a clean air compartment within the enclosure. The tube sheet forms a filter opening through the tube sheet. A filter is located within the filter compartment and includes a filter flange having a filtered air outlet aligned with said filter opening. The filter flange includes a first alignment structure located on a first lateral side of the filter flange, and a second alignment structure located on the first lateral side of the filter flange. The first alignment structure is offset from the second alignment structure along the first lateral side of the filter flange. A clamping assembly comprises a first filter clamp that is movable between a sealing position for sealing the filter flange against the tube sheet, and a release position. The first filter clamp engages the first alignment structure when in the sealing position. The clamping assembly comprises a second filter clamp that is offset from the first filter clamp and is movable between the sealing position for sealing the filter flange against the tube sheet, and the release position. The second filter clamp engages the second alignment structure when in the sealing position. The dust collector includes means for moving both of the first filter clamp and the second filter clamp together between the sealing position and the release position.

In accordance with another aspect of the present invention, provided is a dust collector including an enclosure and a tube sheet separating a filter compartment from a clean air compartment within the enclosure. The tube sheet forms a filter opening through the tube sheet. A filter is located within the filter compartment and includes a filter flange having a filtered air outlet aligned with said filter opening. The filter flange includes a first alignment depression located on a first lateral side of the filter flange, and a second alignment depression located on the first lateral side of the filter flange. The first alignment depression is offset from the second alignment depression along the first lateral side of the filter flange. A clamping assembly comprises a first filter clamp that is movable between a sealing position for sealing the filter flange against the tube sheet, and a release position. A clamping surface of the first filter clamp is located within the first alignment depression when the first filter clamp is in the sealing position. The clamping assembly comprises a second filter clamp that is movable between the sealing position for sealing the filter flange against the tube sheet, and the release position. A clamping surface of the second filter clamp is located within the second alignment depression when the second filter clamp is in the sealing position. A rotatable rail is attached to both of the first filter clamp and the second filter clamp and is configured for moving the first filter clamp and the second filter clamp between the sealing position and the release position. A locking handle is attached to the rotatable rail for manually rotating the rotatable rail and locking the rotatable rail in the sealing position of the first filter clamp and the second filter clamp.

In accordance with another aspect of the present invention, provided is an air filter including a filter flange comprising an upper gasketed sealing surface and a lower clamping surface, an end cap, and a filter element located between the lower clamping surface of the filter flange and the end cap. A first lateral side of the lower clamping surface of the filter flange includes a first clamping depression and a second clamping depression. The first clamping depression and the second clamping depression are linearly aligned along the first lateral side of the lower clamping surface, and the first clamping depression is offset from the second clamping depression along the first lateral side of the lower clamping surface. A second lateral side of the lower clamping surface of the filter flange includes a third clamping depression and a fourth clamping depression, wherein the third clamping depression and the fourth clamping depression are linearly aligned along the second lateral side of the lower clamping surface, and the third clamping depression is offset from the fourth clamping depression along the second lateral side of the lower clamping surface.

DETAILED DESCRIPTION OF THE INVENTION

Embodiments of the present invention relate to dust collectors and air filters for use in dust collectors. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

Figure 1:
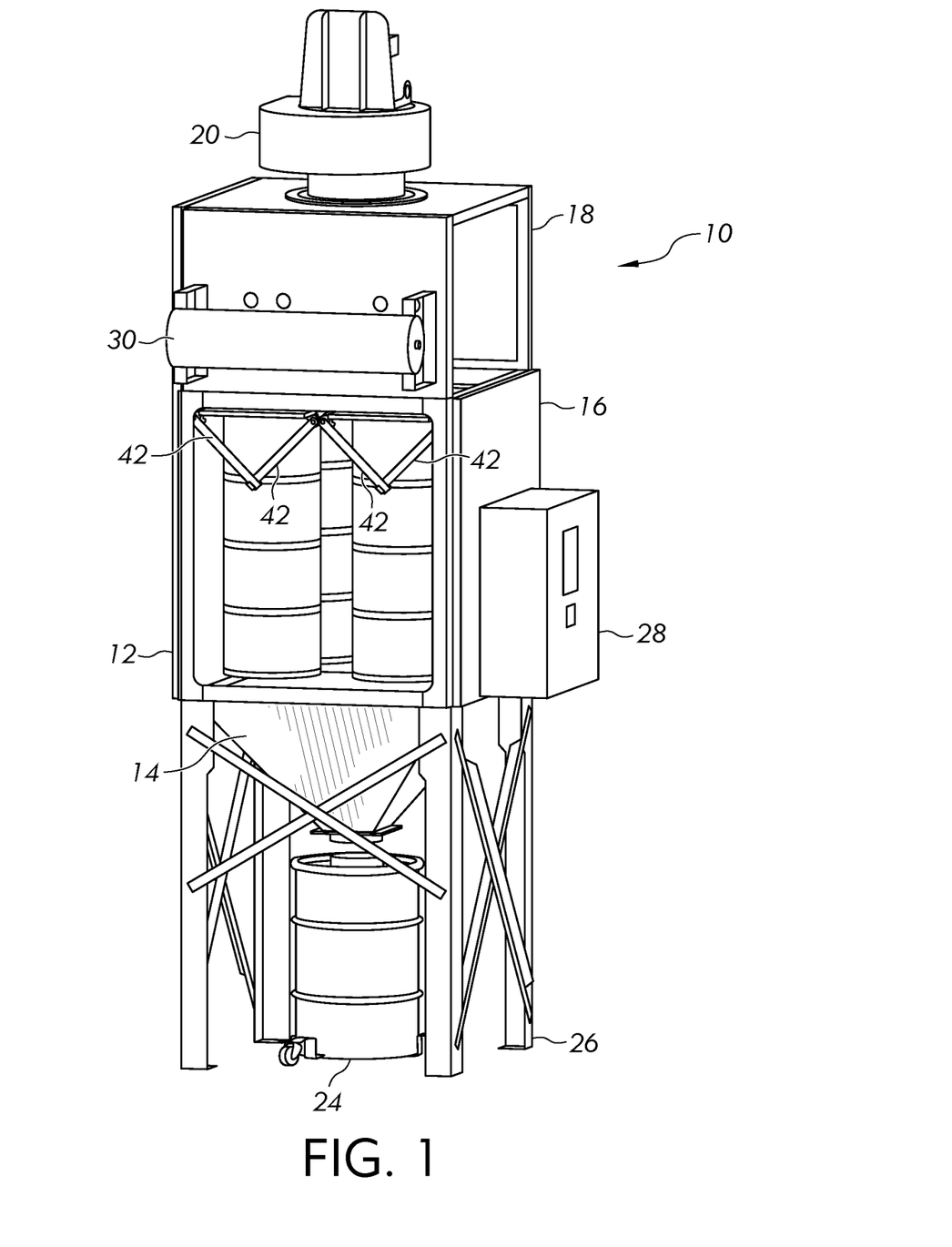
FIG. 1 is a perspective view of a dust collector.
Figure 2:
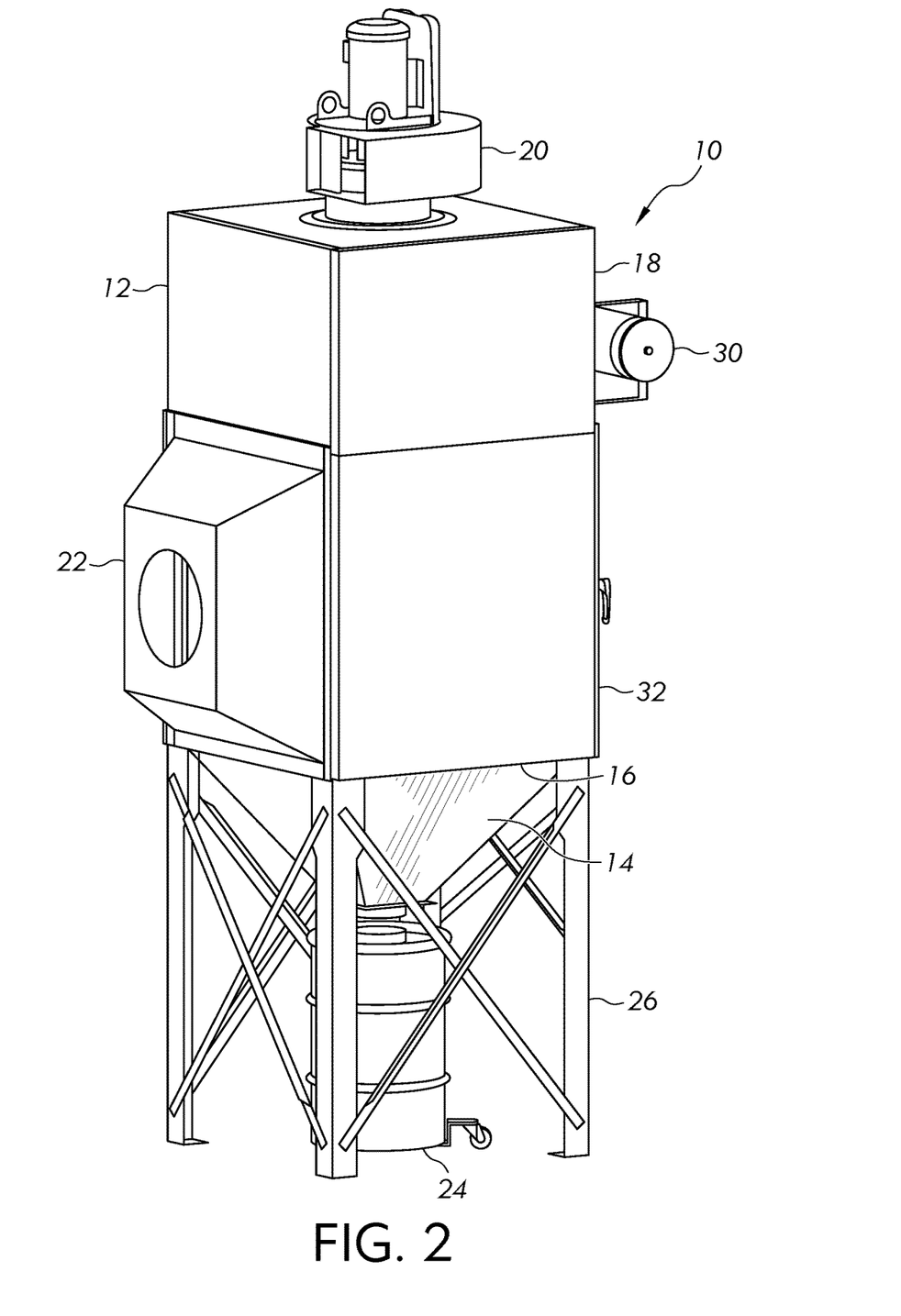
FIG. 2 is a perspective view of the dust collector.

FIGS. 1 and 2 provide perspective views of an example dust collector 10 having replaceable air filters. The dust collector 10 includes an enclosure 12 that forms a lower hopper 14, a central filter compartment 16, and an upper clean air compartment 18. The filter compartment 16 is in fluid communication with the clean air compartment 18 through one or more filters. In the embodiments discussed herein and shown in the figures, the filter compartment 16 contains four filters. However, the filter compartment 16 could contain more or fewer than four filters as desired.

Contaminated air, generated at a workstation such as a welding or plasma cutting station, is drawn or pushed into the filter compartment 16 by a blower or fan 20. An air intake 22 is shown in FIG. 2. The air intake 22 can be connected to ductwork (not shown) for conveying contaminated air to the dust collector 10. The fan 20 can provide an air outlet that may be attached to additional clean air ductwork (not shown) for ventilation to a desired location. The fan 20 can be attached directly to the dust collector 10 as shown, or the fan can be located remote from the dust collector (in which case the clean air compartment 18 would include the air outlet).

Dust and other contaminants are removed from the contaminated air by the filters within the filter compartment 16. The dust can fall into the hopper 14 and be discharged to a receptacle 24. The dust collector 10 can include legs 26 to raise the enclosure 12 above the ground, so that the receptacle 24 can be placed beneath the hopper 14.

The dust collector 10 can include a control panel 28 having a user interface for controlling the operation of the fan 20. The control panel 28 can include indicators to inform a user that a filter requires cleaning or replacement (e.g., based on an increased pressure drop across a filter). The control panel 28 can also include controls for activating a filter cleaning system. The dust collector 10 can utilize blasts of compressed air to "backwash" the filters and dislodge dust from the filter media. The dust collector 10 can include a compressed air tank 30 for storing compressed air provided by an air compressor that is a part of the dust collector or located remote from the dust collector. Valves, such as solenoid valves for example, control the discharge of compressed air from the air tank 30 to the filters in a series of pulses during a cleaning cycle. The clear air compartment 18 can include respective air nozzles aligned with the filters to direct the air pulses in a reverse direction through the filters.

The dust collector 10 includes a door 32 on a front side of the dust collector. The door 32 provides access to the filter compartment 16 to allow the filters to be replaced. The door 32 or enclosure 12 can include a gasket to seal the door against the enclosure when closed.

Figure 3:
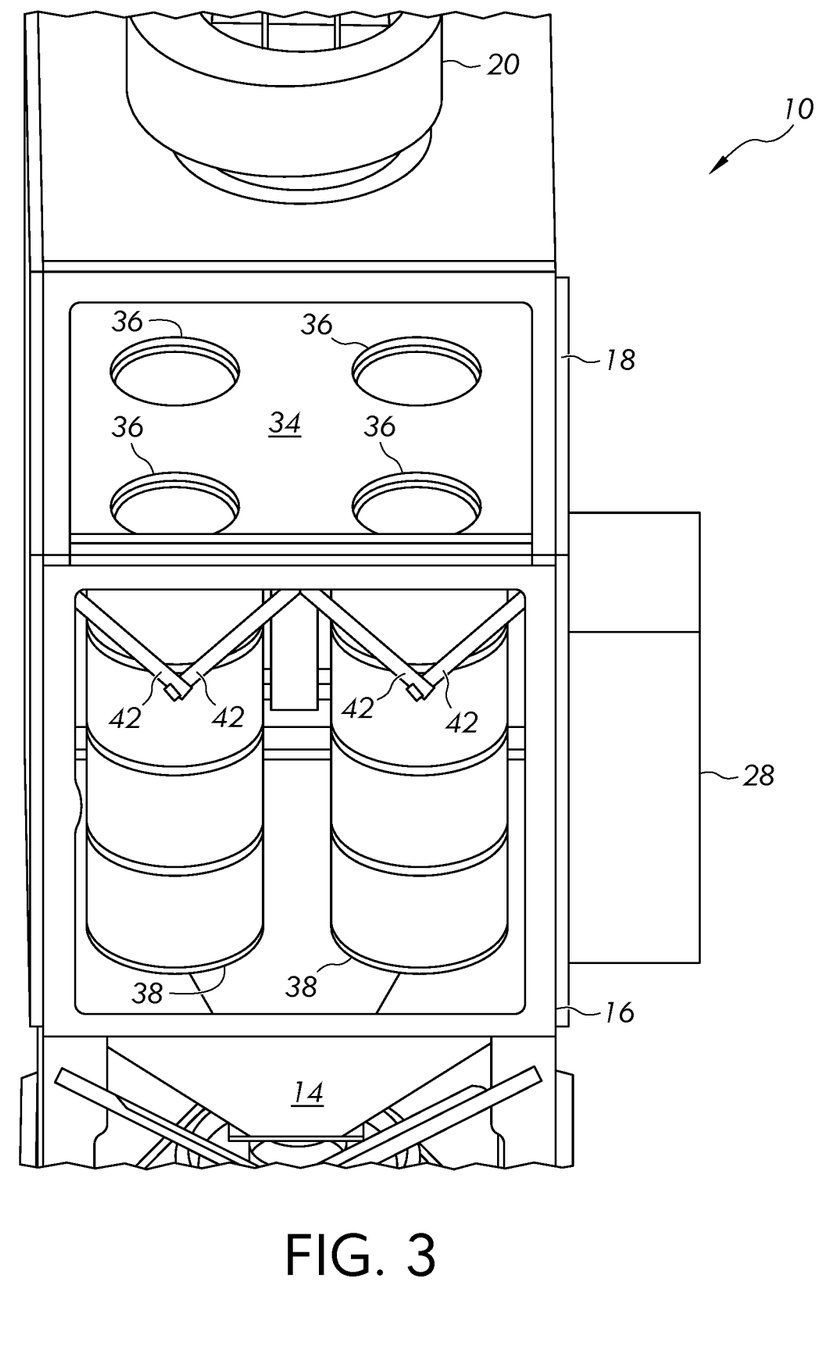
FIG. 3 is a perspective view of a portion of the dust collector.

The interior of the filter compartment 16 and clean air compartment 18 can be seen in FIG. 3. A tube sheet 34 separates the filter compartment 16 from the clean air compartment 18. The tube sheet 34 has a series of filter openings 36 through the tube sheet. The clean air compartment 18 is in fluid communication with the filter compartment 16 through the filter openings 36, and filtered air enters the clean air compartment 16 through the filter openings 36. The filters 38 are generally cylindrical, and air is drawn through the filter walls into the center portion of the filter and upward to the clean air compartment through the filter openings 36 in the tube sheet 34.

Figure 4:
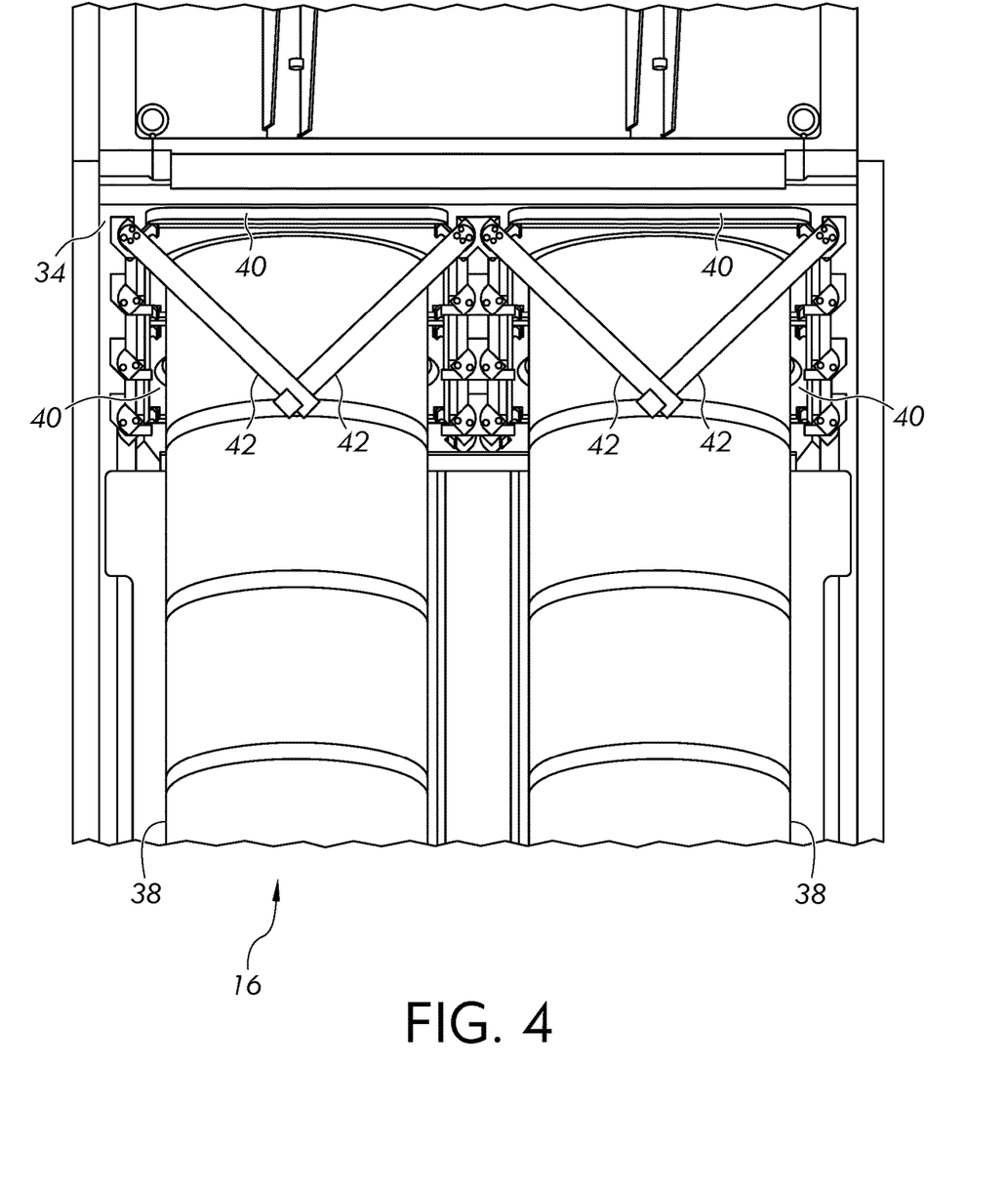
FIG. 4 is a perspective view of a portion of the dust collector.
Figure 5:
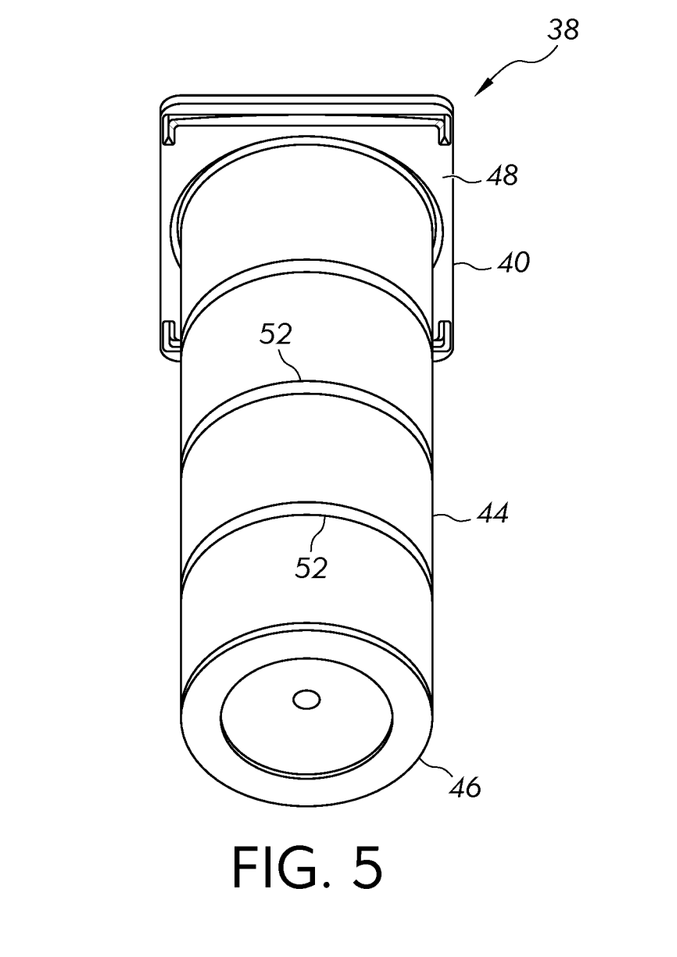
FIG. 5 is a perspective view of a filter.
Figure 6:
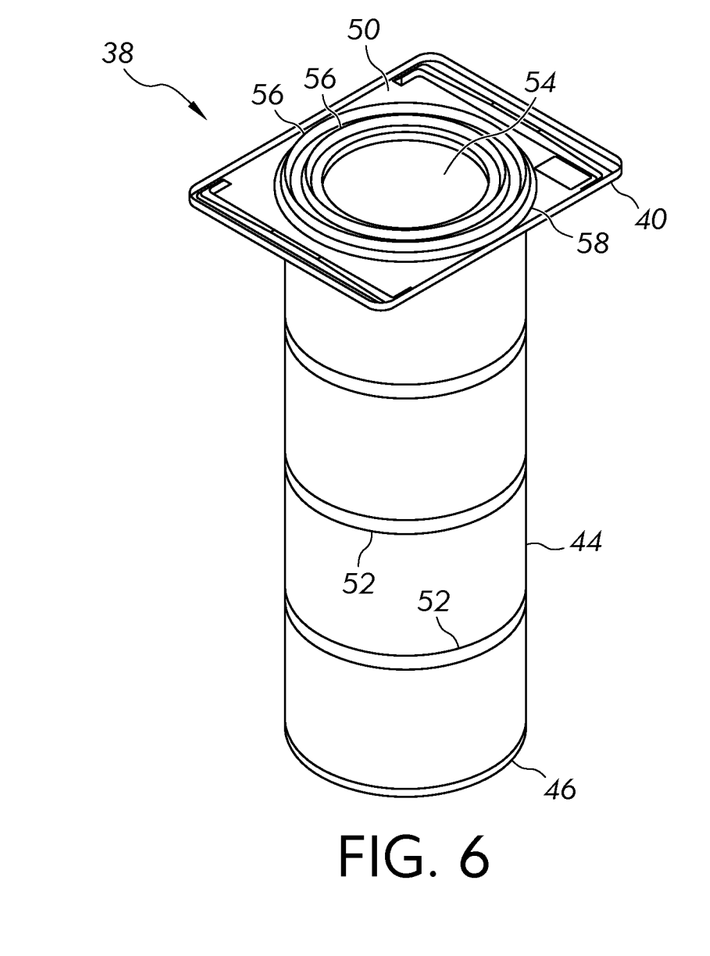
FIG. 6 is a perspective view of the filter.

FIG. 4 is an upward perspective view of the filter compartment 16. Each filter 38 has a filter flange 40 located at the top of the filter for sealing the filter against the lower surface of the tube sheet 34 and around the filter openings in the tube sheet. As will be discussed in detail below, the filter compartment 16 includes a clamping system for clamping the filters against the tube sheet 34 and releasing the filters so that they can be replaced. The clamping system can be manually operable via interlockable clamp handles 42. In FIG. 4, the clamp handles 42 are shown in the sealing position, with the filter flanges 40 sealed against the tube sheet 34. The clamp handles 42 can be locked together at their distal ends to hold the filters 38 in the sealing position. The clamp handles 42 can be moved to a release position so that the filters can be removed. To do this, the distal ends of the clamp handles 42 are unlocked or detached from each other and rotated downward through an acute angle (e.g., approximately 45°). To seal the filters 34 against the tube sheet 34, the clamp handles 42 are rotated upward through the acute angle, clockwise or counterclockwise, and then locked together.

Figure 11:
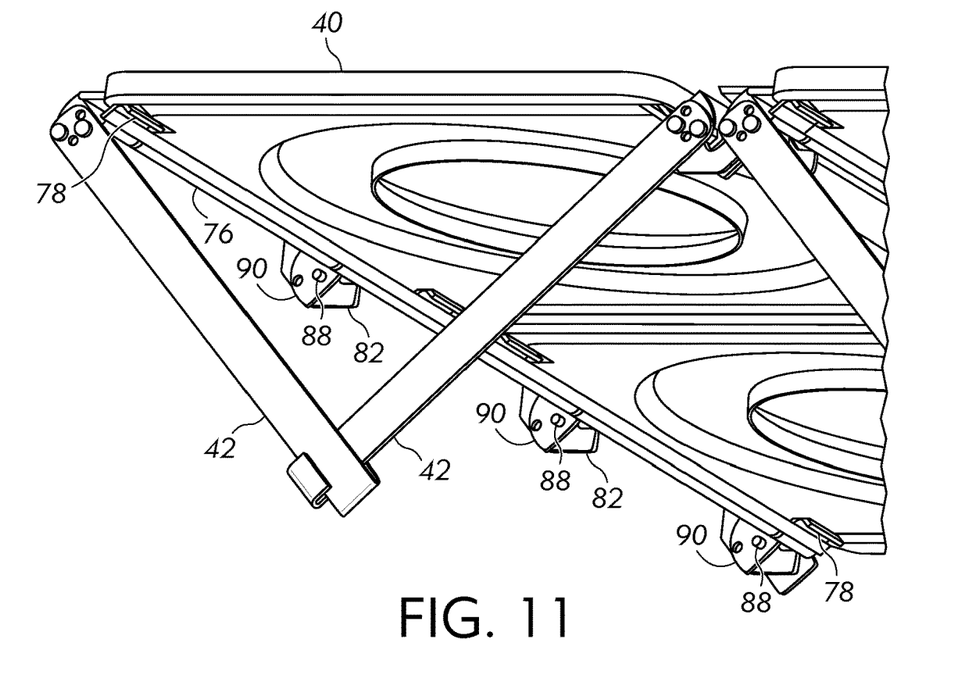
FIG. 11 is a perspective view of a portion of the dust collector.
Figure 12:
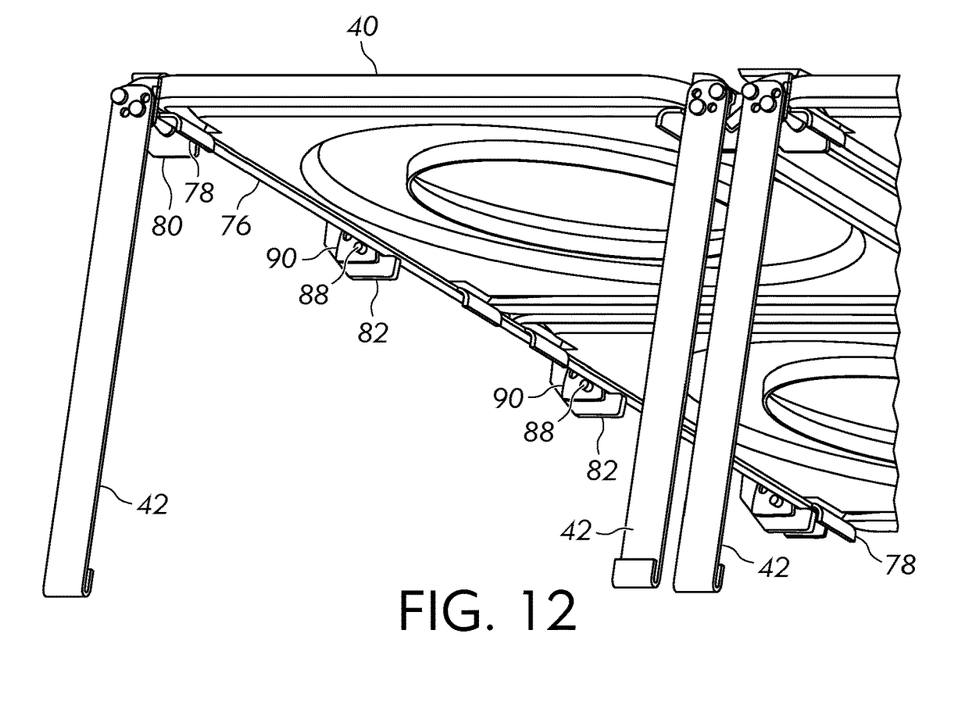
FIG. 12 is a perspective view of a portion of the dust collector.
Figure 13:
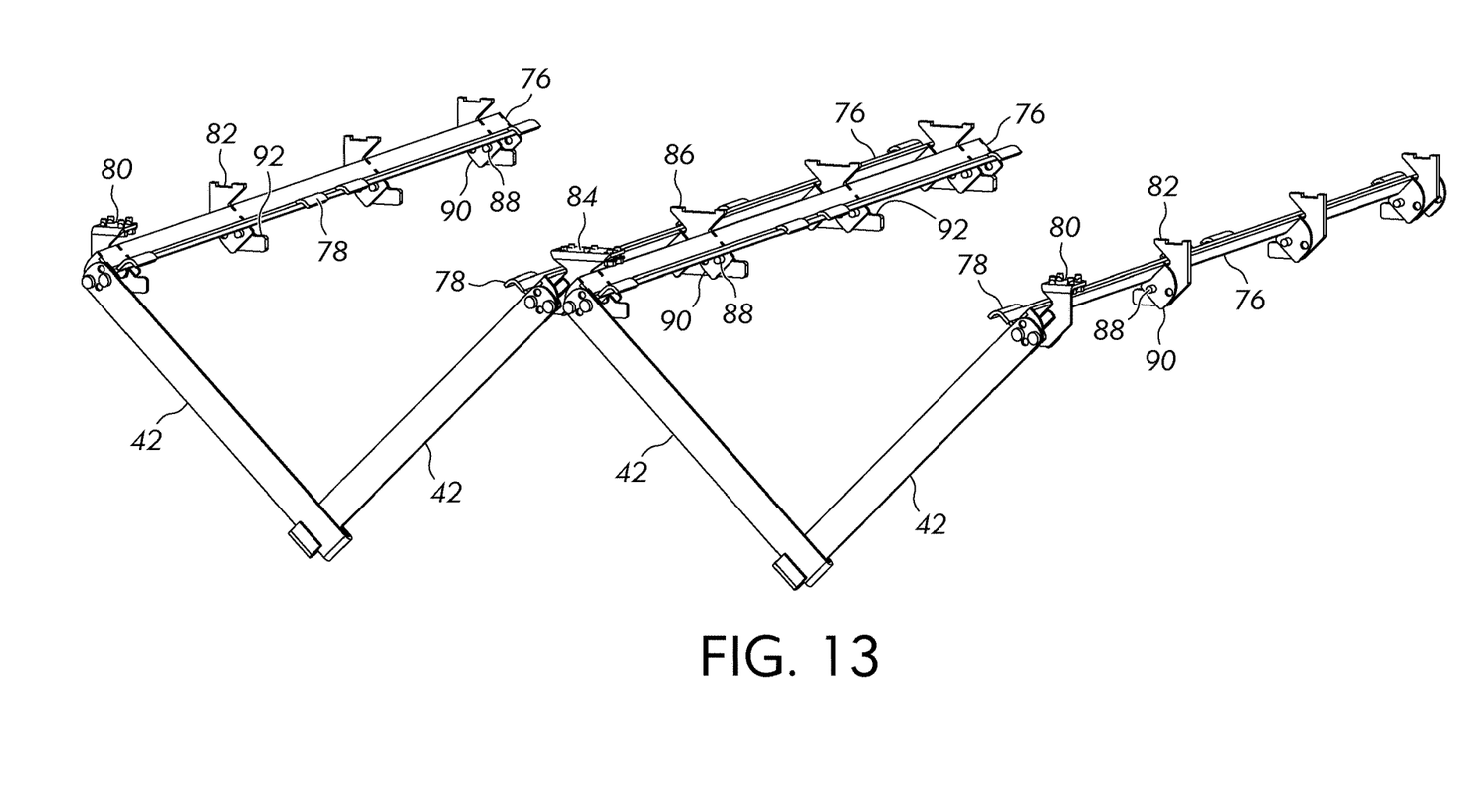
FIG. 13 is a perspective view of a filter clamping system.
Figure 14:
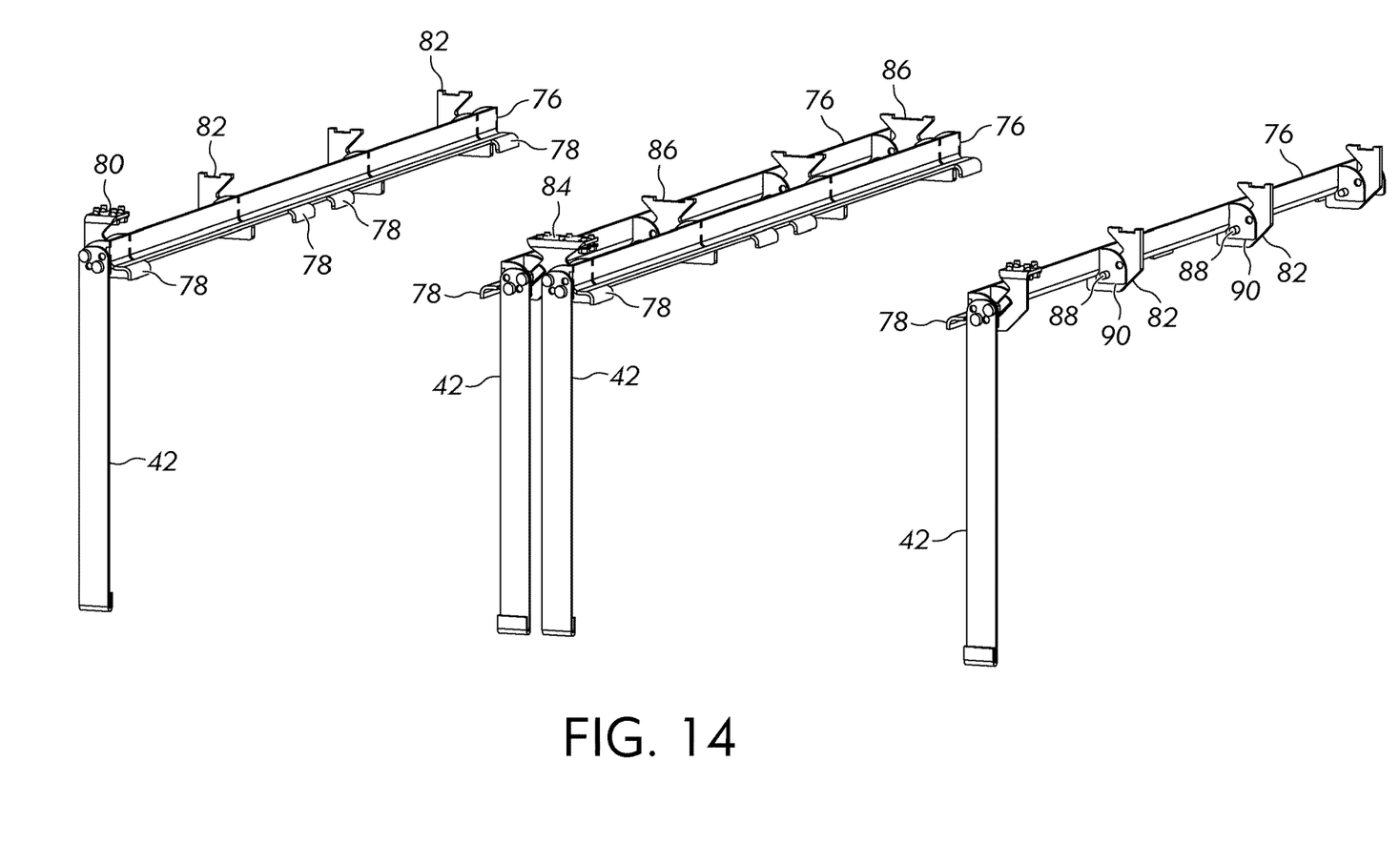
FIG. 14 is a perspective view of the filter clamping system.

The clamping system is configured to seal multiple filters 38 against the tube sheet 34 simultaneously. In FIG. 4, it can be seen that the left and right portions of the clamping system each clamp two filter flanges 40 against the tube sheet 34. The clamping of two filter flanges 40 can also be seen in FIGS. 11 and 12. The left and right portions of the clamping system are operable to simultaneously clamp an inner filter located adjacent a rear wall of the filter compartment 16, and an outer filter located adjacent the clamp handles 42 and the access opening closed by the door. If desired, clamping system can be configured to clamp fewer or more than four filters simultaneously.

The clamping system can be attached directly to the tube sheet 34, such as via fasteners, welding, etc., or attached to other structures within the filter compartment 16.

The filter 38 is shown in detail in FIGS. 5-8. Extending downward from the filter flange 40 is a filter element 44. The filter element 44 can include a tube of filter media, such as a pleated cellulose media or other known filter materials. The lower end of the filter element 44 is capped by an end cap 46. The filter flange 40 has a lower clamping surface 48 and an upper gasketed sealing surface 50 that seals against the tube sheet. The filter element 44 of the air filter is located between the lower clamping surface 48 of the filter flange 40 and the end cap 46. The filter element 44 can be adhered to the filter flange 40 and end cap 46, for example glued to the lower clamping surface 48 and end cap 46, to form air tight connections. The filter element 44 can include a series of bands 52 (e.g., polyester bands or other suitable material) to help maintain the cylindrical shape of the filter element, and the filter element can include a cylindrical inner structural cage (not shown) if desired.

Figure 7:
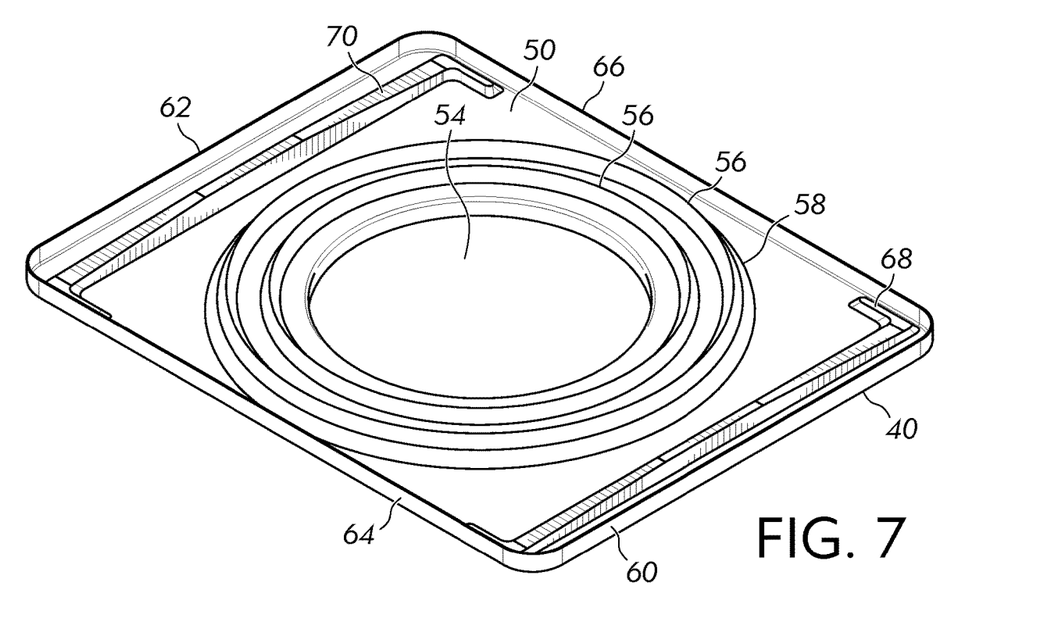
FIG. 7 shows a filter flange.
Figure 8:
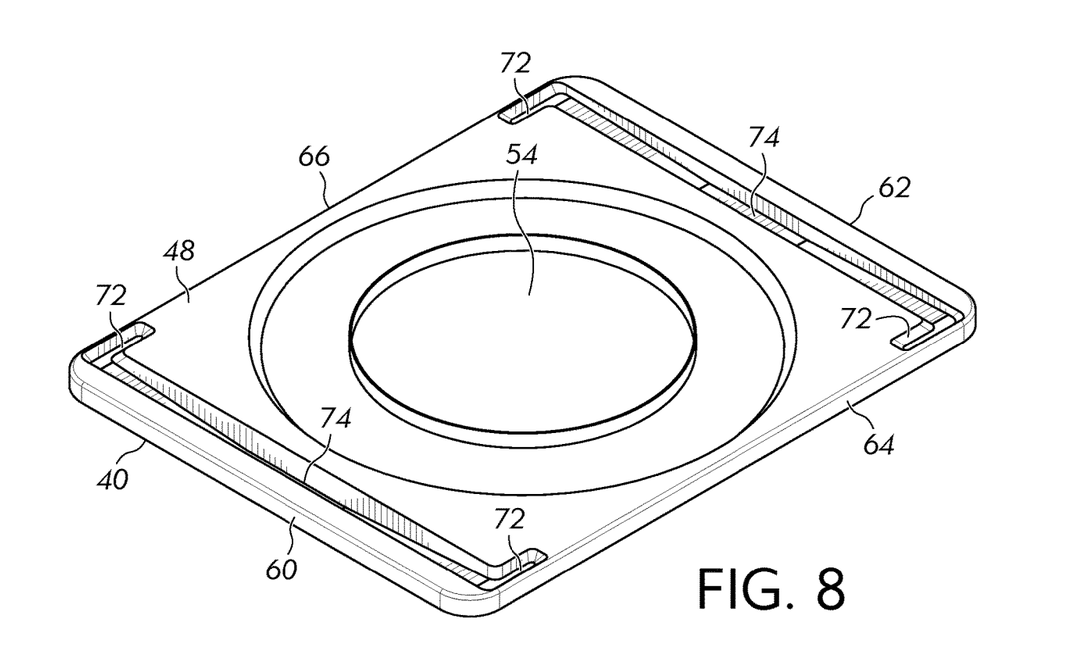
FIG. 8 shows the filter flange.
Figure 9:
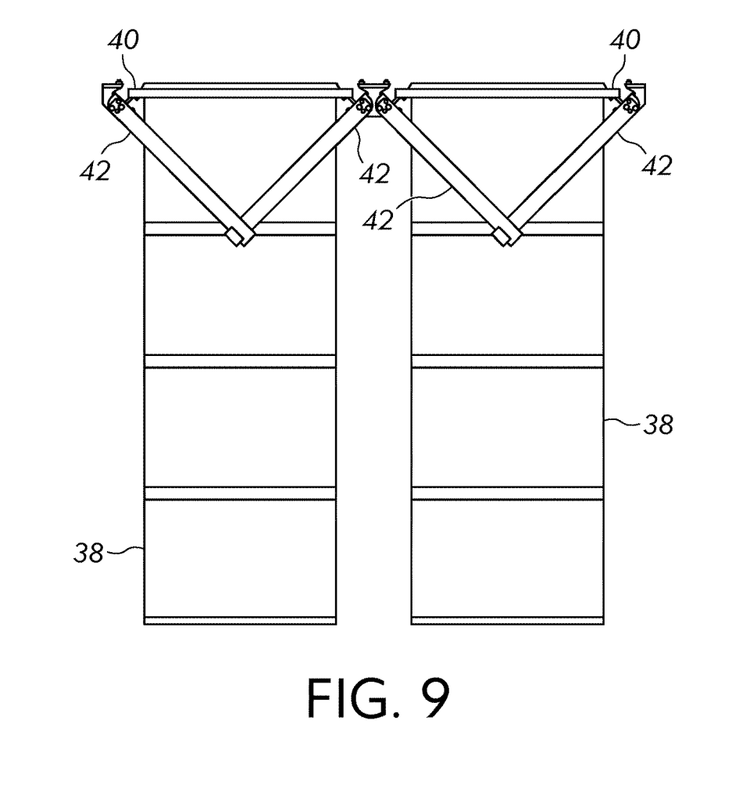
FIG. 9 is an elevation view of a portion of the dust collector.
Figure 10:
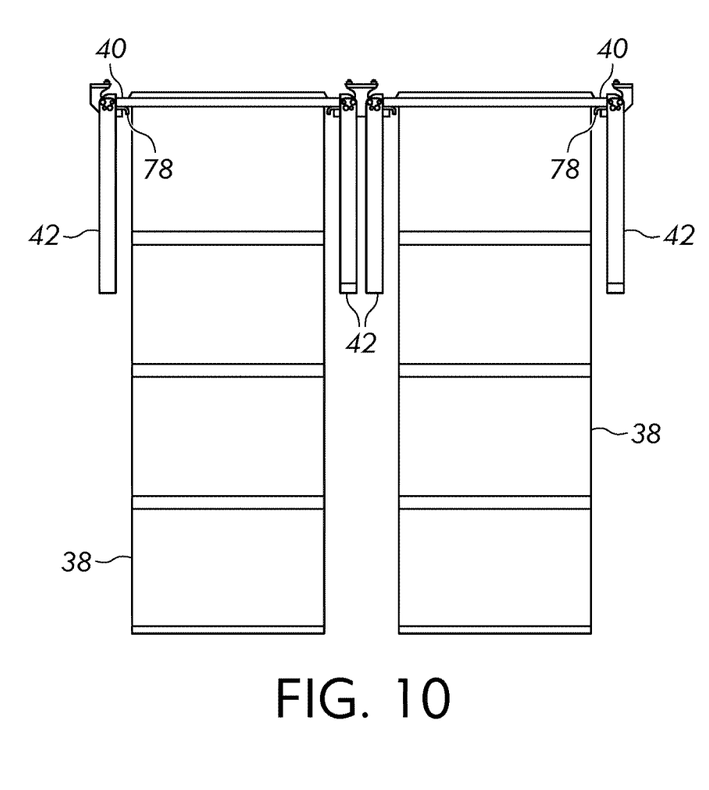
FIG. 10 is an elevation view of a portion of the dust collector.

The filter flange 40 can be substantially rectangular in shape, although other shapes are possible, such as square or octagonal for example. The filter flange 40 can have rounded or filleted corners and can take the form of a tray having upturned edges to strengthen the filter flange. The upper gasketed sealing surface 50 of the filter flange 40 is shown in FIG. 7, and the lower clamping surface 48 is shown in FIG. 8. It can be seen that the filter flange 40 includes stamped or embossed portions that form depressions in the lower clamping surface 48 and raised surface features in the upper gasketed sealing surface 50.

The filter flange forms a central aperture 54 that is aligned with a filter opening in the tube sheet to allow filtered air to enter the clean air compartment. The central aperture 54 serves as a filtered air outlet for the filter 38. The upper gasketed sealing surface 50 of the filter flange 40 can include one or more gaskets 56 surrounding the central aperture 54 to seal flange against the tube sheet. Alternatively, one or more gaskets can be provided on the tube sheet itself. The gasket can be formed from an elastomeric material, such as EDPM rubber (ethylene propylene diene monomer rubber) for example. In the shown embodiment, the gaskets 56 are concentrically arranged with the central aperture 54 and filter element 44 and are located on a circular raised surface feature 58 on the upper gasketed sealing surface 50.

Forward 60 and rear 62 ends of the filter flange 40 extend between lateral (left and right) sides 64, 66 of the filter flange 40. In FIG. 7, it can be seen that the filter flange 40 includes generally C-shaped raised surface features 68, 70 adjacent the forward 60 and rear 62 ends of the filter flange and continuing along the lateral sides 64, 66 for a short distance past the corners of the flange. As will be explained below, the C-shaped raised surface features 68, 70 can be utilized from the lower clamping surface 48 as handle depressions, and also as alignment structures (e.g., alignment or clamping depressions) that interact with the clamping system to properly position the filter 38 within the dust collector.

The alignment or clamping depressions 72 in the lower clamping surface 48 can be best seen in FIG. 8. The clamping depressions 72 are located along the lateral sides 64, 66 of the filter flange 40, but could be located at other locations on the filter flange if desired. Along either lateral side 64, 66, the clamping depressions 72 are linearly aligned with and offset from each other to receive respective clamps in the clamping system. The filter element and gaskets are located between the central aperture 54 and the clamping depressions 72, and the clamping depressions can be arranged symmetrically around the central aperture.

The handle depressions 74 extend between respective pairs of clamping depressions 72 adjacent the forward and rear ends 60, 62 of the filter flange 40. The handle depressions 72 need not extend all the way from one clamping depression 72 to another; however doing so allows a handle depression 74 and two clamping depressions 72 to be stamped into the filter flange together by a common die. The handle depressions 74 provide a handgrip to aid in inserting and removing the filters 38 from the dust collector, and also help to strengthen the filter flange. In the example embodiment shown, the filter flange 40 has two handle depressions 74, one at either end 60, 62. Thus, either end 60, 62 of the filter flange 40 can be inserted into the filter compartment first while still providing a handgrip. However, if desired a single handle depression, or no handle depression, can be provided on the filter flange 40.

FIGS. 4 and 9-14 show details of the filter clamping system in the dust collector 10. The clamping system is shown in the release position in FIGS. 10, 12 and 14, and in the sealing position in FIGS. 4, 9, 11 and 13. The clamping system includes rotatable rails 76 that are each attached to a respective clamp handle 42 at a proximal end of the clamp handle. The filters 38 are inserted onto the rotatable rails 76 with the rails and handles 42 in the release position. The rotatable rails 76 can have a generally L-shape as shown in the figures, or another suitable shape (e.g., C-shaped) that is capable of supporting the filter flanges 40. Each rotatable rail 76 is sufficiently long to support multiple (e.g., two) filter flanges 40 simultaneously. When the clamp handles 42 are rotated upward from a vertical orientation in the release position through the acute angle to the sealing position, the filters 38 are lifted upward by rotation of the rails 76 and an upward rotation of filter clamps 78 attached to the rotatable rails 76. The filter clamps 78 seat within corresponding clamping depressions 72 in the filter flange to seal the filter flange 40 against the tube sheet 34. If the filters 38 are incorrectly installed in the dust collector 10, an operator will become aware of the incorrect installation because the filter gaskets 56 will be compressed against the tube sheet 34 before the clamp handles 42 are completely rotated through the acute angle to the sealing position, since the filter clamps 78 will not be located in the clamping depressions 72. The operator will be unable to properly interlock the clamp handles 42 because the distal ends of the clamp handles will be separated. Thus, the clamping depressions 72 serve as alignment structures for the filters 38.

The filter clamps 78 are configured as curved tabs that project outward and downward from the rotatable rails 76 when the rails are in the release position. The curved surfaces of the filter clamps 78 are clamping surfaces that engage the clamping depressions 72 in the filter flanges 40 when the rails 76 are in the sealing position. The curved clamping surfaces act as cams that lift the filters 38 vertically as the rotatable rails 76 are rotated through the acute angle to the sealing position. When in the release position, the clamping surfaces of the filter clamps 78 are located outside of the clamping depressions 72 in the filter flanges 40 (e.g., located just beneath the clamping depressions), and the filter flanges rest on the rails 76.

In the example dust collector 10 shown in the drawings, each filter 38 is clamped in the sealing position by four filter clamps 78, two on the left lateral side of the filter and two on the right lateral side of the filter, and each rotatable rail 76 has eight attached filter clamps to seal and release two filters simultaneously. Additional clamps 78 could be utilized for each filter 38, such as three or four per lateral side for example.

The clamp handles 42 can be interlocked to maintain the filters 38 raised in the sealing position. Interlocking the clamp handles 42 can be done in various ways, such as by using a locking or fastening device (e.g., bolt, lock, shackle, etc.), or via interlocking components located at the distal ends of the clamp handles. In the example embodiment shown in the figures, the distal ends of the clamp handles 42 have a J-shape for capturing a cooperating clamp handle in a handshake-like arrangement. The shapes of each handle 42 can be identical, so that the handle can be installed on either a right lateral side or left lateral side rotatable rail.

The clamping system of the dust collector 10 includes clamping assemblies extending along the lateral sides of the filters. The clamping assemblies include the clamp handles 42, rotatable rails 76, filter clamps 78, brackets for supporting the clamping system within the filter compartment, and hinges for the rotatable rails.

The clamping assemblies can be configured to support a single rotatable rail 76 or multiple rotatable rails. The clamping assemblies on the far left and right sides of the filter compartment include a single rotatable rail 76. However, the clamping assembly in the center of the filter compartment is located between all four filters 38 and includes two rotatable rails 76 (one rail for clamping the two filters on the left side of the filter compartment, and one rail for clamping the two filters on the right side of the filter compartment).

Brackets 80, 82, 84, 86 having hinge pins 88 support the rotatable rails 76 in the filter compartment 16. Pivot plates 90 are attached to the rotatable rails 76 and the pivot plates rotate on the hinge pins 88. The brackets 80, 82, 84, 86 can include stop surfaces that limit the clockwise and counterclockwise rotation of the rails 76 within the bracket. For example, the brackets 80, 82, 84, 86 can include a ledge 92 that limits the downward rotation of the rails 76 to the release position, and an angled edge that limits the upward rotation of the rails to the sealing position. Other types of stops could be provided on the brackets 80, 82, 84, 86 to limit the rotation of the rails (e.g., stops built into the hinge mechanism).

In the example embodiment shown in the drawings, each rail 76 is supported by four brackets. However, the rails 76 could be supported by fewer or more than four brackets. The forward-most brackets 80, 82 have fasteners for attaching the brackets to the tube sheet 34 or other structure in the filter compartment 16. The rear brackets 86, 88 lack fasteners and could be attached to the tube sheet or other structure by a welded connection for example.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An air filter, comprising:
    a filter flange comprising an upper gasketed sealing surface and a lower clamping surface;
    an end cap;
    a filter element located between the lower clamping surface of the filter flange and the end cap,
    wherein a first lateral side of the lower clamping surface of the filter flange includes a first clamping depression and a second clamping depression, wherein the first clamping depression and the second clamping depression are linearly aligned along the first lateral side of the lower clamping surface, and the first clamping depression is offset from the second clamping depression along the first lateral side of the lower clamping surface, and
    wherein a second lateral side of the lower clamping surface of the filter flange includes a third clamping depression and a fourth clamping depression, wherein the third clamping depression and the fourth clamping depression are linearly aligned along the second lateral side of the lower clamping surface, and the third clamping depression is offset from the fourth clamping depression along the second lateral side of the lower clamping surface,
    wherein the first clamping depression, the second clamping depression, the third clamping depression, and the fourth clamping depression form respective raised surface features on the upper gasketed sealing surface.

2. The air filter of claim 1, wherein the filter flange forms a central aperture, and the upper gasketed sealing surface includes a gasket concentric with the central aperture and located between the central aperture and each of the first clamping depression, the second clamping depression, the third clamping depression and the fourth clamping depression.

3. The air filter of claim 1, wherein the filter flange includes a first end extending between the first lateral side and the second lateral side, and a second end extending between the first lateral side and the second lateral side, and the filter flange includes a handle depression formed in the lower clamping surface and adjacent at least one of the first end and the second end, wherein the handle depression forms a further raised surface feature on the upper gasketed sealing surface.

4. The air filter of claim 1, wherein the filter flange forms a central aperture, and the filter element is concentric with the central aperture and located between the central aperture and each of the first clamping depression, the second clamping depression, the third clamping depression and the fourth clamping depression, and wherein the filter element is glued to the lower clamping surface of the filter flange.

5. The air filter of claim 1, further comprising a plurality of bands surrounding the filter element.

6. The air filter of claim 1, wherein the filter element is adhered to the lower clamping surface of the filter flange.

7. An air filter, comprising:
    a filter flange comprising an upper gasketed sealing surface and a lower clamping surface;
    an end cap;
    a filter element located between the lower clamping surface of the filter flange and the end cap,
    wherein a first lateral side of the lower clamping surface of the filter flange includes a first clamping depression and a second clamping depression, wherein the first clamping depression and the second clamping depression are linearly aligned along the first lateral side of the lower clamping surface, and the first clamping depression is offset from the second clamping depression along the first lateral side of the lower clamping surface, and wherein a second lateral side of the lower clamping surface of the filter flange includes a third clamping depression and a fourth clamping depression, wherein the third clamping depression and the fourth clamping depression are linearly aligned along the second lateral side of the lower clamping surface, and the third clamping depression is offset from the fourth clamping depression along the second lateral side of the lower clamping surface, wherein the filter flange includes a first end extending between the first lateral side and the second lateral side, and a second end extending between the first lateral side and the second lateral side, and the filter flange includes a handle depression formed in the lower clamping surface and adjacent at least one of the first end and the second end, and wherein the handle depression extends from the first clamping depression to the third clamping depression.

8. The air filter of claim 7, further comprising another handle depression formed in the lower clamping surface and located between the second clamping depression and the fourth clamping depression.

9. An air filter, comprising:
a filter flange comprising an upper gasketed sealing surface and a lower clamping surface;
an end cap; and
a filter element located between the lower clamping surface of the filter flange and the end cap, wherein:
a first lateral side portion of the lower clamping surface of the filter flange includes a first clamping depression and a second clamping depression, wherein the first clamping depression and the second clamping depression are linearly aligned along the first lateral side portion of the lower clamping surface, and the first clamping depression is offset from the second clamping depression along the first lateral side portion of the lower clamping surface,
a second lateral side portion of the lower clamping surface of the filter flange includes a third clamping depression and a fourth clamping depression, wherein the third clamping depression and the fourth clamping depression are linearly aligned along the second lateral side portion of the lower clamping surface, and the third clamping depression is offset from the fourth clamping depression along the second lateral side portion of the lower clamping surface,
the filter flange forms a central aperture, and the upper gasketed sealing surface includes a gasket concentric with the central aperture and located between the central aperture and each of the first clamping depression, the second clamping depression, the third clamping depression and the fourth clamping depression, and
the filter element is concentric with the central aperture and located between the central aperture and each of the first clamping depression, the second clamping depression, the third clamping depression and the fourth clamping depression,
wherein the first clamping depression, the second clamping depression, the third clamping depression, and the fourth clamping depression form respective raised surface features on the upper gasketed sealing surface.

10. The air filter of claim 9, wherein the filter flange includes a handle depression formed in the lower clamping surface and adjacent an end portion of the filter flange, wherein the handle depression forms a further raised surface feature on the upper gasketed sealing surface.

11. The air filter of claim 9, wherein the filter element is glued to the lower clamping surface of the filter flange.

12. An air filter, comprising:
a filter flange comprising an upper gasketed sealing surface and a lower clamping surface;
an end cap; and
a filter element located between the lower clamping surface of the filter flange and the end cap, wherein:
a first lateral side portion of the lower clamping surface of the filter flange includes a first clamping depression and a second clamping depression, wherein the first clamping depression and the second clamping depression are linearly aligned along the first lateral side portion of the lower clamping surface, and the first clamping depression is offset from the second clamping depression along the first lateral side portion of the lower clamping surface,
a second lateral side portion of the lower clamping surface of the filter flange includes a third clamping depression and a fourth clamping depression, wherein the third clamping depression and the fourth clamping depression are linearly aligned along the second lateral side portion of the lower clamping surface, and the third clamping depression is offset from the fourth clamping depression along the second lateral side portion of the lower clamping surface,
the filter flange forms a central aperture, and the upper gasketed sealing surface includes a gasket concentric with the central aperture and located between the central aperture and each of the first clamping depression, the second clamping depression, the third clamping depression and the fourth clamping depression, and
the filter element is concentric with the central aperture and located between the central aperture and each of the first clamping depression, the second clamping depression, the third clamping depression and the fourth clamping depression,
wherein the filter flange includes a handle depression formed in the lower clamping surface and adjacent an end portion of the filter flange, and wherein the handle depression extends from the first clamping depression to the third clamping depression.

13. The air filter of claim 12, further comprising another handle depression formed in the lower clamping surface and located between the second clamping depression and the fourth clamping depression.

14. The air filter of claim 13, further comprising a plurality of bands surrounding the filter element.

15. An air filter, comprising:
a filter flange comprising an upper gasketed sealing surface and a lower clamping surface;
an end cap; and
a filter element located between the lower clamping surface of the filter flange and the end cap, wherein:
a first lateral side portion of the lower clamping surface of the filter flange includes a first clamping depression,
a second lateral side portion of the lower clamping surface of the filter flange includes a second clamping depression,
the filter flange forms a central aperture, and the upper gasketed sealing surface includes a gasket concentric with the central aperture,
the filter element is concentric with the central aperture, and
the first clamping depression forms a first raised surface feature on the upper gasketed sealing surface, and the second clamping depression forms a second raised surface feature on the upper gasketed sealing surface.

16. The air filter of claim 15, wherein the filter flange includes a first end extending between the first lateral side portion and the second lateral side portion, and a second end extending between the first lateral side portion and the second lateral side portion, and the filter flange includes a handle depression formed in the lower clamping surface and adjacent at least one of the first end and the second end, wherein the handle depression forms a further raised surface feature on the upper gasketed sealing surface.

17. The air filter of claim 15, wherein the filter element is glued to the lower clamping surface of the filter flange.

18. An air filter, comprising:
- a filter flange comprising an upper gasketed sealing surface and a lower clamping surface;
- an end cap; and
- a filter element located between the lower clamping surface of the filter flange and the end cap, wherein:
- a first lateral side portion of the lower clamping surface of the filter flange includes a first clamping depression,
- a second lateral side portion of the lower clamping surface of the filter flange includes a second clamping depression,
- the filter flange forms a central aperture, and the upper gasketed sealing surface includes a gasket concentric with the central aperture, and
- the filter element is concentric with the central aperture,
- wherein the filter flange includes a first end extending between the first lateral side portion and the second lateral side portion, and a second end extending between the first lateral side portion and the second lateral side portion, and the filter flange includes a handle depression formed in the lower clamping surface and adjacent at least one of the first end and the second end,
- wherein the handle depression extends from the first clamping depression to the second clamping depression.

19. The air filter of claim 18, further comprising another handle depression formed in the lower clamping surface.

20. The air filter of claim 19, further comprising a plurality of bands surrounding the filter element.

* * * * *